United States Patent
Lu et al.

(10) Patent No.: US 10,764,820 B2
(45) Date of Patent: Sep. 1, 2020

(54) METHOD FOR MEASURING WIRELESS LINK QUALITY AND USER EQUIPMENT

(71) Applicant: BAICELLS TECHNOLOGIES CO. LTD., Beijing (CN)

(72) Inventors: Yang Lu, Beijing (CN); Lixin Sun, Beijing (CN); Yingzhe Ding, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 0 days.

(21) Appl. No.: 16/304,974

(22) PCT Filed: May 24, 2017

(86) PCT No.: PCT/CN2017/085719
§ 371 (c)(1),
(2) Date: Nov. 27, 2018

(87) PCT Pub. No.: WO2017/202339
PCT Pub. Date: Nov. 30, 2017

(65) Prior Publication Data
US 2019/0289535 A1    Sep. 19, 2019

(30) Foreign Application Priority Data
May 27, 2016  (CN) .......................... 2016 1 0365876

(51) Int. Cl.
*H04W 48/16*     (2009.01)
*H04L 5/00*      (2006.01)
(Continued)

(52) U.S. Cl.
CPC .......... *H04W 48/16* (2013.01); *H04L 5/0051* (2013.01); *H04W 24/08* (2013.01); *H04W 24/10* (2013.01);
(Continued)

(58) Field of Classification Search
CPC ... H04W 48/16; H04W 56/003; H04W 24/10; H04W 74/0808; H04W 72/0446; H04L 5/0051
See application file for complete search history.

(56) References Cited

U.S. PATENT DOCUMENTS

2013/0178219 A1*  7/2013  Lee ........................ H04W 72/04
                                                    455/450
2015/0163729 A1*  6/2015  Seo ........................ H04W 76/14
                                                    370/336
(Continued)

FOREIGN PATENT DOCUMENTS

CN       105611637 A     5/2016
WO       2014165712 A1   10/2014
(Continued)

OTHER PUBLICATIONS

"3 Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.3.0, Mar. 2016, France (295 pages).
(Continued)

*Primary Examiner* — Jamal Javaid
(74) *Attorney, Agent, or Firm* — Culhane Meadows PLLC; Stephen J. Weed

(57) ABSTRACT

A method for measuring a quality of a wireless link and a user equipment are provided. The method includes obtaining a probability that a base station successfully transmits a DRS; detecting a CRS in each subframe in a predetermined assessment period to obtain a subframe status of each subframe, the subframe status including a status that the CRS is detected and a status that the DRS is not detected in a wireless link measurement window; determining a status generation reason of a subframe having the status that the
(Continued)

DRS is not detected in the wireless link measurement window, according to the probability; and performing a predetermined detection to the quality of the wireless link in the predetermined assessment period according to the status generation reason and the subframe status of the subframe, so as to determine a state of the wireless link.

20 Claims, 10 Drawing Sheets

(51) Int. Cl.
    *H04W 24/10*     (2009.01)
    *H04W 56/00*     (2009.01)
    *H04W 72/04*     (2009.01)
    *H04W 74/08*     (2009.01)
    *H04W 24/08*     (2009.01)

(52) U.S. Cl.
    CPC ..... *H04W 56/003* (2013.01); *H04W 72/0446* (2013.01); *H04W 74/0808* (2013.01)

(56) References Cited

U.S. PATENT DOCUMENTS

| | | | |
|---|---|---|---|
| 2016/0330678 A1* | 11/2016 | Yoon | H04W 48/12 |
| 2017/0265095 A1 | 9/2017 | Harada et al. | |
| 2017/0289937 A1 | 10/2017 | Urabayashi et al. | |

FOREIGN PATENT DOCUMENTS

| | | | |
|---|---|---|---|
| WO | 2016017328 | A1 | 6/2017 |
| WO | 2016047513 | A1 | 7/2017 |
| WO | 2017144514 | A1 | 8/2017 |

OTHER PUBLICATIONS

"3 Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, France (97 pages).

"3 Generation Partnership Project; Technical Specification Group Radio Access Network; Evolved Universal Terrestrial Radio Access (E-UTRA); Requirements for support of radio resource management (Release 13)", 3GPP TS 36.133, V13.3.0, Mar. 2016, France (document split in 5 parts—1581 total pages).

1st Japanese Office Action for Japanese Application No. 2018-562197, dated Dec. 26, 2019 (Dec. 26, 2019)—3 pages (English translation—3 pages).

Ericsson: "Inter-frequency measurement requirements for LAA", 3GPP TSG RAN WG4 Meeting #78, R4-160998, Malta, Feb. 4, 2016 (Feb. 14, 2016), 2 pages.

Extended European Search Report for European Application No. 17802185.3 dated Dec. 3, 2019 (Dec. 3, 2019)—18 pages.

\* cited by examiner

METHOD FOR MEASURING WIRELESS LINK QUALITY AND USER EQUIPMENT

CROSS-REFERENCE TO RELATED APPLICATION

The present application is a U.S. national phase application of a PCT Application No. PCT/CN2017/085719 filed on May 24, 2017, which claims a priority of a Chinese patent application No. 201610365876.5 filed in China on May 27, 2016, disclosures of which are incorporated herein in their entirety by reference.

TECHNICAL FIELD

The present disclosure relates to a field of communication technology, and in particular, relates to a method for measuring a quality of a wireless link and a User Equipment (UE).

BACKGROUND

MulteFire is a new radio access technology based on a Long Term Evolution (LTE), and may operate in a non-licensed frequency band without an aid of a licensed frequency band. The MulteFire expands the LTE into the non-licensed frequency band. A mechanism similar to a carrier sense technique in a Wireless Fidelity (WiFi) is introduced for a physical layer of the MulteFire, called Listen Before Talk (LBT), so as to fairly contend channel resources in the non-licensed frequency band with a WiFi device. In case that a Base Station (BS) or a User Equipment (UE) senses that a channel in the non-licensed frequency band is occupied, i.e. in case that the LBT fails, the BS or the UE stops transmitting a signal; in case that the BS or the UE senses that the channel is free, i.e., in case that the LBT succeeds, the BS or the UE transmits a signal.

In a LTE system, each downlink subframe includes a Cell Specific Reference Signal (CRS). If the CRS is not detected by the UF, the UE determines that a channel quality at this sample is poor. However, if a Discovery Reference Signal (DRS) is not detected in a MulteFire system, a reason thereof may be that the BS does not transmit the DRS in a DRS Transmission Window (DTxW) due to failure of the LBT; the reason thereof is probably also not the failure of the LBT, but that the UE does not detect the DRS due to a poor downlink channel quality. In case that the BS does not transmit the DRS due to the failure of the LBT in the DTxW, it cannot be determined that a channel quality of a subframe in which the DRS is not detected is poor. A Sample in which the DRS is not detected is a factor needing to be considered in in-sync detection or out-of-sync detection of a wireless link. In a related art, a Reference Signal Receiving Quality (RSRQ) of a reference signal of the Sample in which the DRS is not detected is considered to be low. This may incur that an assessed receiving signal quality in the in-sync detection or the out-of-sync detection of the UE is lower than an actual receiving signal quality. Additionally, the BS in the MulteFire system only transmits the CRS in a subframe in which the DRS exists or in another subframe including transmission of a Physical Downlink Shared Channel (PDSCH), but does not transmit the CRS in other subframes. Therefore, the UE may not use any subframe as the Sample for detecting a wireless link. A result of the in-sync detection or the out-of-sync detection of a wireless link in the MulteFire system using the method in the LTE system in the related art is not accurate.

SUMMARY

An objective of the present disclosure is to provide a method for measuring a quality of a wireless link and a user equipment, so as to address a technical problem in a MulteFire system that an assessed receiving signal quality is lower than an actual receiving signal quality using an in-sync detection method or an out-of-sync detection method in a relevant LTE system, causing a result of an in-sync detection or an out-of-sync detection method inaccurate.

To this end, some embodiments of the present disclosure provide a method for measuring a quality of a wireless link. The method includes: obtaining a probability that a base station successfully transmits a Discovery Reference Signal (DRS); detecting a Cell Specific Reference Signal (CRS) in each subframe in a predetermined assessment period, so as to obtain a subframe status of the each subframe, wherein the subframe status includes a status that the CRS is detected and a status that the DRS is not detected in a wireless link measurement window, determining a status generation reason of a subframe having the status that the DRS is not detected in the wireless link measurement window, according to the probability that the base station successfully transmits the DRS; and performing a predetermined detection to the quality of the wireless link in the predetermined assessment period according to the status generation reason and the subframe status of the subframe, so as to determine a state of the wireless link.

Some embodiments of the present disclosure provide a user equipment. The user equipment includes a first obtaining module configured to obtain a probability that a base station successfully transmits a Discovery Reference Signal (DRS); a status detection module configured to detect a Cell Specific Reference Signal (CRS) in each subframe in a predetermined assessment period, so as to obtain a subframe status of the each subframe, wherein the subframe status includes a status that the CRS is detected and a status that the DRS is not detected in a wireless link measurement window; a determination module, configured to determine a status generation reason of a subframe having the status that the DRS is not detected in the wireless link measurement window, according to the probability that the base station successfully transmits the DRS; and a link state determination module, configured to perform a predetermined detection to a quality of a wireless link in a predetermined assessment period according to the status generation reason and the subframe status of the subframe, so as to determine a state of the wireless link.

Some embodiments of the present disclosure further provide a user equipment. The user equipment includes a receiver and a processor; wherein the receiver is configured to receive a probability that a base station successfully transmits a Discovery Reference Signal (DRS); and the processor is connected to the receiver and is configure to implement the method according to the present disclosure.

Technical solutions of the present disclosure at least have advantages as follow: in the method for measuring a quality of a wireless link and the user equipment provided in the present disclosure, a status generation reason of a subframe having a status that a DRS is not detected in a wireless link measurement window is judged firstly, and a quality of a wireless link is detected. Thus, an assessed RSRQ is closer to an actual channel quality and a result of an in-sync detection or an out-of-sync detection is more accurate.

DETAILED DESCRIPTION

Figure 1:
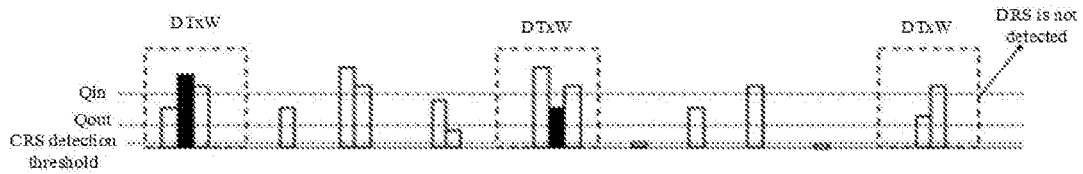
FIG. 1 is a schematic diagram of an in-sync detection in a MulteFire system.

In order to make objectives, technical solutions, and advantages of the present disclosure clearer, specific embodiments will be described hereinafter in detail in combination with accompanying drawings of the present disclosure.

If a method in a Long Term Evolution (LTE) system is used in in-sync detection or out-of-sync detection in a MulteFire System, an accessed receiving signal quality is lower than an actual receiving signal quality, thereby incurring that a result of the in-sync detection or the out-of-sync detection is inaccurate. Directed to this problem, a method for measuring a quality of a wireless link and a User Equipment (UE) are provided in the present disclosure.

In order to increase a transmission efficiency of downlink common control signals of a Base Station (BS) under a mechanism called Listen Before Talk (LBT), the MulteFire introduces a reference signal, i.e., Discovery Reference Signal (DRS). The DRS includes main downlink common control signals including a system broadcast, a Primary Sync Signal (PSS), a Secondary Sync Signal (SSS), an enhanced Primary Sync Signal (ePSS), an enhanced Secondary Sync Signal (eSSS), and a Cell Specific Reference Signal (CRS). The DRS occupies 12 or 14 symbols in a downlink subframe. The DRS is transmitted in a DRS transmission window (DTxW). In case that the LBT of the BS is successful, the BS transmits the DRS once in the DTxW. A duration of the DTxW is 1 ms to 10 ms. A minimum period that the DTxW appears is 40 ms, and a period that the DTxW appears has to be an integral multiple of 40 ms.

The MulteFire introduces a DRS Measurement Timing Configuration (DMTC) window. A User Equipment (UE) measures the CRS of a serving cell and the CRS of a neighboring cell in the DMTC window appearing periodically, for purpose of detecting a quality of a wireless link, selecting a cell, re-selecting a cell or performing a handover procedure. The BS may configure an independent DMTC for each of a MulteFire serving cell, an intra-frequency neighbouring cell of the MulteFire serving cell, and an inter-frequency neighbouring cell of the MulteFire serving cell. Since the MulteFire may only ensure the CRS is transmitted in a subframe including the DRS in the DTxW, a DMTC window at each frequency bin and in each cell has to include a DTxW corresponding to the frequency bin and the cell, so as to measure the CRS in the subframe including the DRS at the frequency bin and in the cell. A duration of the DMTC window is 1 ms to 10 ms. The UE only measures a quality of a wireless link in a DMTC of the serving cell, a DMTC of the intra-frequency neighboring cell and a DMTC of the inter-frequency neighboring cell.

In the LTE system, the base station transmits the CRS in each downlink subframe, and each downlink subframe may be used as a detection Sample. The UE assesses a quality of a downlink channel by measuring a Reference Signal Receiving Quality (RSRQ) of a CRS signal. In the out-of-sync detection, the UE measures RSRQs of CRSs in an out-of-sync assessment period (such as 200 ms) and assesses an average RSRQ of the CRSs. If the assessed average RSRQ is lower than a predetermined out-of-sync threshold (Qout) of a downlink channel, the UE determines that the downlink channel is out of sync, and a physical layer of the UE transmits an out-of-sync indication to higher layers of the UE. In the in-sync detection, the UE measures the RSRQs of the CRSs in an in-sync assessment period (such as 100 ms) and assesses an average RSRQ of the CRSs. If the assessed average RSRQ is higher than a predetermined in-sync threshold (Qin) of the downlink channel, the UE determines that the downlink channel is in sync, and the physical layer of the UE transmits an in-sync indication to the higher layers of the UE.

A wireless link measurement window of the UE is generally the DTxW or the DMTC, or may be a window including the DTxW or the DMTC.

However, the base station in the MulteFire system only transmits the CRS in a subframe in which the DRS exists or in a subframe including transmission of a Physical Downlink Shared CHannel (PDSCH), but does not transmit the CRS in other subframes.

Figure 2:
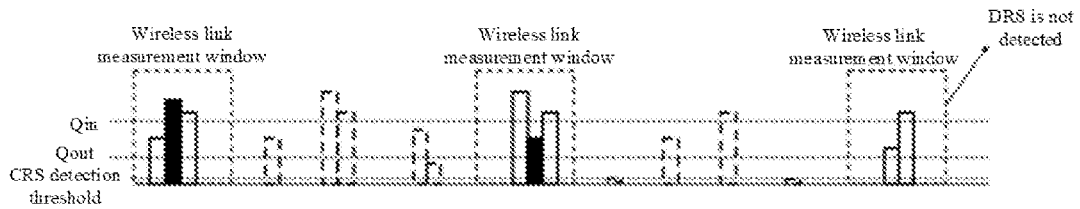
FIG. 2 is a schematic diagram of an out-of-sync detection in the MulteFire system.

FIG. 1 is a schematic diagram of in-sync detection in the MulteFire system. In the in-sync detection, the UE only considers a Sample in which the CRS is detected in the in-sync assessment period and a Sample in which the DRS is not detected. FIG. 2 is a schematic diagram of out-of-sync detection in the MulteFire system. In the out-of-sync detection, the UE only considers a Sample in which the CRS is detected in a wireless link measurement window (DTxW or DMTC) and a Sample in which the DRS is not detected. The Sample in which the CRS is detected refers to a Sample in which a RSRQ of the CRS is higher than a predetermined detection threshold and a Sample in which the DRS is detected in the wireless link measurement window. The DRS being detected in the wireless link measurement window means that the PSS/SSS and ePSS/eSSS of the DRS are detected in a subframe in the DTxW, and the DRS not being detected in the wireless-link measurement window means that the PSS/SSS or the ePSS/eSSs of the DRS is not detected in each subframe in the wireless link measurement window.

In the LTE system, the base station transmits the CRS in each downlink subframe, and each downlink subframe may be used as the Sample in the detections. The UE assesses a downlink channel quality by measuring the RSRQ of the CRS signal. In the MulteFire system, assessment of the downlink channel quality is also performed in the above way.

Figure 3:
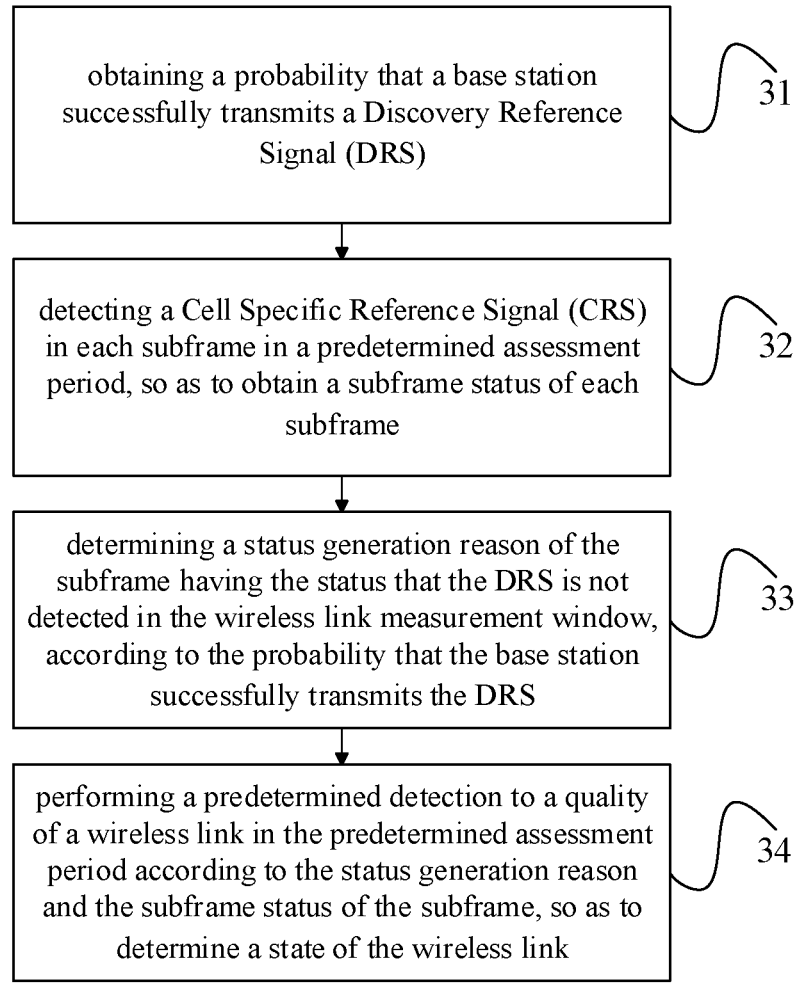
FIG. 3 is a flowchart of a method for measuring a quality of a wireless link according to some embodiments of the present disclosure.

As shown in FIG. 3, a method for measuring a quality of a wireless link is provided in some embodiments of the present disclosure, and includes steps 31 to steps 34.

Step 31: obtaining a probability that a base station successfully transmits a Discovery Reference Signal (DRS).

It should be noted that when no downlink data is transmitted, the base station may perform a short LBT (Cat.2 LBT) in each subframe in the DTxW to attempt transmitting the DRS, and may detect a channel in 25 microseconds in first two symbols in a subframe in the DTxW. If the channel is detected as not being occupied, the DRS is transmitted and occupies 12 symbols. If downlink data is to be transmitted, the base station may also perform an ordinary LBT (Cat.4 LBT) when transmitting the downlink data in the PDSCH, and transmit the DRS in subframes including a Burst of the PDSCH (subframes continuously transmitted by the base station) or in subframes subsequent to the subframes including the Burst of the PDSCH. The base station performs the Cat.4 LBT before transmitting the downlink data in the PDSCH, and if the channel is not occupied, the base station transmits the data in the PDSCH and transmits the CRS. If subframes 0 and 5 in the DTxW are included in a transmission time of the downlink Burst after the LBT is performed, the base station may need not to perform the Cat.2 LBT and the DRS may be sent once directly in the subframes 0 and 5, and the DRS occupies 14 symbols. If the base station does not contend any channel in the DTxW, the DRS is not transmitted. Therefore, a probability that the base station transmits the DRS is a probability that the base station contends a channel in the DTxW, and a range of the probability is 0-100%.

Step 32: detecting a Cell Specific Reference Signal (CRS) in each subframe in a predetermined assessment period, so as to obtain a subframe status of each subframe, wherein the subframe status of a subframe includes a status that the CRS is detected and a status that the DRS is not detected in the wireless link measurement window.

In step 32, determination of the subframe status of each subframe may be performed in the predetermined assessment period. It should be noted that a status that the DRS is not detected in the wireless link measurement window means that the PSS/SSS or the ePSS/eSSS of the DRS is not detected in each subframe in the wireless link measurement window.

It should be further noted that, the predetermined assessment period may be an in-sync assessment period or an out-of-sync assessment period.

Step 33: determining a status generation reason of the subframe having the status that the DRS is not detected in the wireless link measurement window, according to the probability that the base station successfully transmits the DRS.

It should be noted that, the status generation reason is mainly a reason attributed to failure of the LBT of the base station, or a reason not attributed to failure of the LBT of the base station.

Step 34: performing a predetermined detection to a quality of a wireless link in the predetermined assessment period according to the status generation reason and the subframe status of the subframe, so as to determine a state of the wireless link.

In some embodiments of the present disclosure, after the status generation reason of the subframe having the status that the DRS is not detected in the wireless link measurement window is figured out, the in-sync detection or the out-of-sync detection may be performed to the wireless link so as to determine the state of the wireless. The RSRQ measured in this way is closer to an actual quality of a channel. By the measured RSRQ, a state of the wireless link may be obtained more accurately, thereby ensuring a result of the in-sync detection or the out-of-sync detection is more precise.

Figure 4:
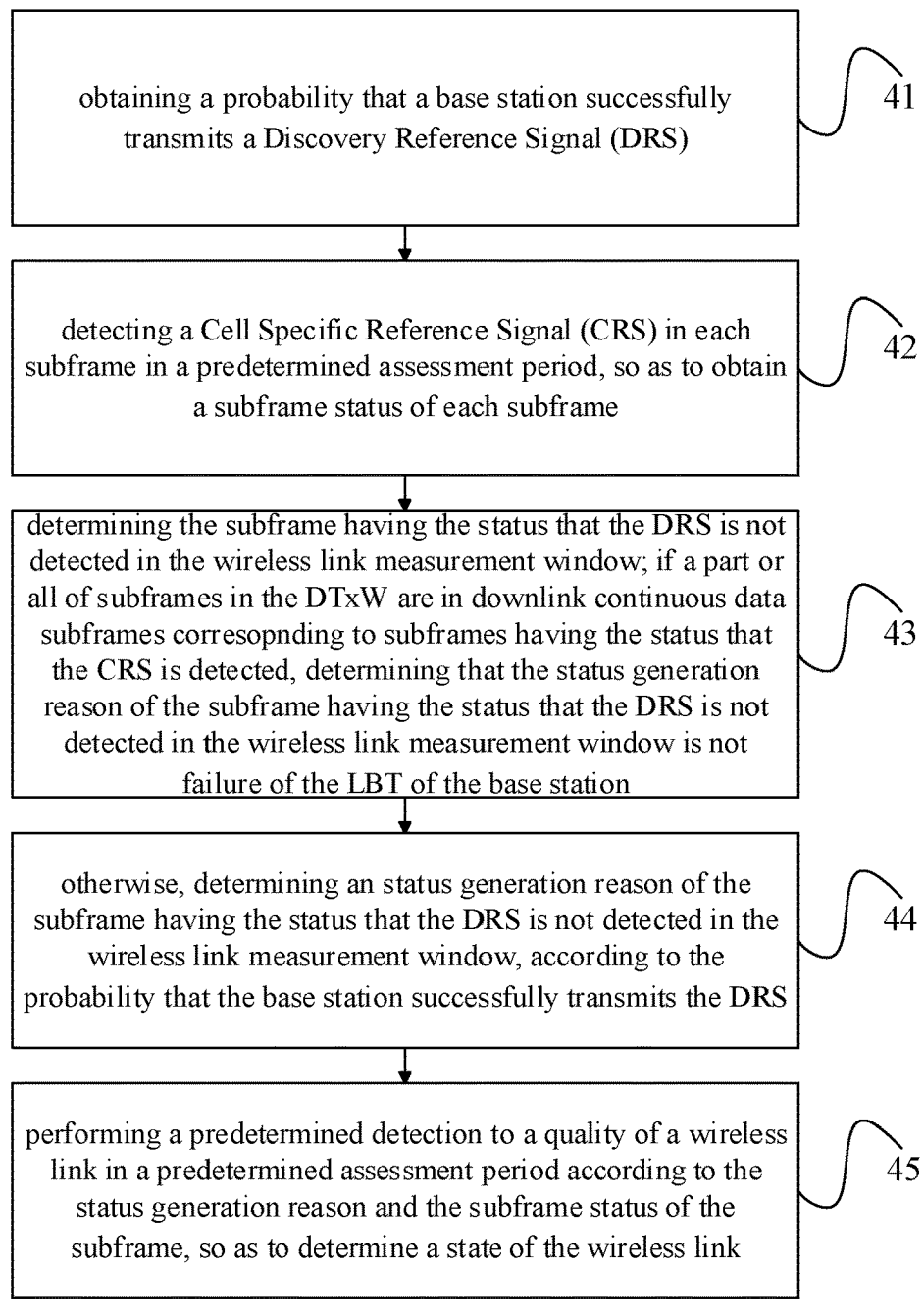
FIG. 4 is a flowchart of a method for measuring a quality of a wireless link according to some embodiments of the present disclosure.

As shown in FIG. 4, a method for measuring a quality of a wireless link is provided in some embodiments of the present disclosure, and includes steps 41 to steps 45.

Step 41: obtaining a probability that a base station successfully transmits a Discovery Reference Signal (DRS).

It should be noted that, the probability that the base station transmits the DRS successfully may be obtained in two ways as follow.

A first way: obtaining the probability that the base station transmits the DRS successfully, wherein the probability is transmitted by the base station through a system broadcast in a predetermined period.

In actual applications, the base station may transmits, to the UE in the system broadcast (such as in an eSIB), an average probability that the DRS is transmitted successfully in the predetermined period, and the UE may obtain, by receiving the system broadcast from the base station, the average probability that the DRS is successfully transmitted by the base station.

A second way: obtaining an average channel occupancy rate computed in the predetermined period and sent by the base station in the system broadcast, and determining the probability that the base station successfully transmits the DRS, according to the average channel occupancy rate.

In actual applications, the base station may also transmits, to the UE in the system broadcast, the average channel occupancy rate computed in the predetermined period, and the UE may obtain, by receiving the system broadcast from the base station, the average channel occupancy rate transmitted by the base station, and take the average channel occupancy rate as the probability that the base station successfully transmits the DRS or the UE may compute the probability that the base station successfully transmits the DRS according to the average channel occupancy rate.

Step 42: detecting a Cell Specific Reference Signal (CRS) in each subframe in a predetermined assessment period, so as to obtain a subframe status of each subframe, wherein the subframe status includes a status that the CRS is detected and a status that the DRS is not detected in a wireless link measurement window.

It should be noted that, in actual applications, a specific implementation of this step includes: in the predetermined assessment period, if the Reference Signal Receiving Quality (RSRQ) of the CRS is detected as being larger than or equal to a CRS detection threshold, the subframe status of the detected subframe is marked as the status that the CRS is detected; if the DRS is detected in the wireless link measurement window in the predetermined assessment period, the subframe status of the subframe in which the DRS is detected is marked as the status that the CRS is detected; if the DRS is not detected in the wireless link measurement window in the predetermined assessment period, the subframe status of the subframe in which the DRS is not detected is marked as the status that the DRS is not detected in the wireless link measurement window.

It should be noted that, the DRS being detected in the wireless link measurement window means that the PSS/SSS and ePSS/eSSS of the DRS are detected in a subframe in the wireless link measurement window, and the DRS not being detected in the wireless link measurement window means that the PSS/SSS or the ePSS/eSSS of the DRS is not detected in each subframe in the wireless link measurement window.

It should be further noted that the wireless link measurement window is the DTxW or the DMTC, or is a window including the DTxW or the DMTC.

Step 43: determining the subframe having the status that the DRS is not detected in the wireless link measurement window; if a part or all of subframes in the DTxW are in downlink continuous data subframes corresponding to subframes having the status that the CRS is detected, determining that the status generation reason of the subframe having the status that the DRS is not detected in the wireless link measurement window is not failure of the LBT of the base station; otherwise, performing the step 44.

If a part or all of the subframes in the DTxW are in the downlink continuous data subframes corresponding to subframes having the status that the CRS is detected, determining that the status generation reason of the subframe having the status that the DRS is not detected in the wireless link measurement window is not the failure of the LBT of the base station in the step 43 may be performed in ways as follow.

First way: if a part or all of the subframes in the DTxW are in the downlink continuous data subframes corresponding to the subframes having the status that the CRS is detected before the DTxW or in the wireless link measurement window, it may be determined that the status generation reason of the subframe having the status that the DRS is not detected in the wireless link measurement window is not the failure of the LBT of the base station.

It should be noted that, when downlink data is to be transmitted, the base station may perform the ordinary LBT (Cat. 4 LBT) when transmitting the downlink data, and then transmit the DRS in the Burst of the PDSCH or in continuous subframes subsequent the Burst of the PDSCH, and the base station performs the Cat.4 LBT before transmitting the downlink data in the PDSCH. If the channel is detected to not be occupied, the base station transmits the downlink data in the PDSCH and transmits the CRS. If the subframe 0 or subframe 5 in the DTxW is included in the transmission time of the downlink Burst after the LBT, the base station may not perform the Cat.2 LBT and transmit the DRS once in the subframe 0 or the subframe 5 directly. The DRS occupies 14 symbols.

Figure 5:
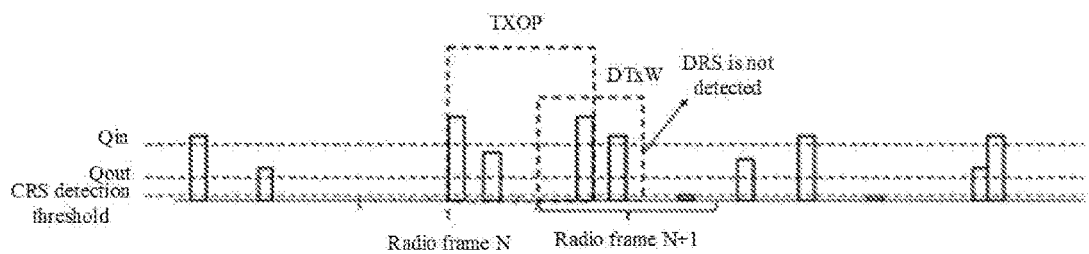
FIG. 5 is a schematic diagram of a transmission state of a radio frame.

If the UE detects a subframe having the status that the CRS is detected, and a part or all of the subframes in the DTxW are in the downlink Burst corresponding to the subframe having the status that the CRS is detected, it may be determined that the base station transmits the DRS once in the Burst directly, and a reason that a subframe including the DRS is not detected in the wireless link measurement window is not the failure of the LBT. The UE may obtain a first subframe and a duration of the downlink Burst through the PDCCH or the C-PDCCH or other physical layer channels transmitted by the base station. For example, as shown in FIG. 5, the UE detects the subframe having the status that the CRS is detected in the subframe 5 in a radio frame N, and does not detect the subframe including the DRS in the DTxW in a subsequent radio frame N+1. If the UE obtains the first subframe of the Burst corresponding to the subframe 5 of the radio frame N and the Burst has a duration of 8 ms, the UE may determine that a part of the subframes in the DTxW is in the Burst corresponding to the subframe 5, and the (UE may determine that the reason that the CRS in the subframe including the DRS is not detected in the wireless link measurement window is not the failure of the LBT.

Specifically, if the UE detects continuous subframes having the status that the CRS is detected before the subframe 0 in the DTxW or detects the CRS in the subframe 0 in the DTxW, the UE may determine that the DRS is transmitted in the subframe 0 in the DTxW by the base station, i.e., the reason of the subframe including the DRS is not detected in the wireless link measurement window is not the failure of the LBT; or when the UE detects continuous subframes having the status that the CRS is detected before the subframe 5 in the DTxW or detects the CRS in the subframe 0 in the DTxW, then the UE may determine that the base station transmits the DRS in the subframe 0 in the DTxW, i.e., the reason that the CRS in the subframe including the DRS is not detected in the wireless link measurement window is not the failure of the LBT.

Second way: if a part or all of the subframes in the DTxW is in the downlink continuous data subframes corresponding to subframes having the status that the CRS is detected after the DTxW, it may be determined that the status generation reason of the subframe having the status that the DRS is not detected in the wireless link measurement window is not the failure of the LBT of the base station.

Specifically, because a probability that the base station performs the LBT again in a sufficiently short time duration, if a subframe including the CRS is detected in a predetermined time duration (such as four subframes) after the DTxW, the UE may determine that a part or all of the subframes in the DTxW and the subframe in which the CRS is detected are in a Burst corresponding to a same successful LBT process, and the reason that a subframe including the DRS is not detected in the wireless link measurement window is not the failure of the LBT:

Step 44: determining an status generation reason of the subframe having the status that the DRS is not detected in the wireless link measurement window, according to the probability that the base station successfully transmits the DRS.

The status generation reason mainly is a reason attributed to the failure of the LBT of the base station, or a reason not attributed to failure of the LBT of the base station.

The step 44 may be implemented in ways as follow.

First way: if the probability that the base station transmits the DRS successfully is larger than or equal to a predetermined probability threshold, it may be determined that the status generation reason of the subframe having the status that the DRS is not detected in the wireless link measurement window is the failure of the LBT of the base station; otherwise, the status generation reason of the subframe having the status that the DRS is not detected in the wireless link measurement window is not the failure of the LBT of the base station.

Second Way: obtaining a reference value generated according to a predetermined rule, wherein the reference value may be larger than or equal to 0 and smaller than or equal to 1. It should be noted that, the reference value is a random number within 0-100% generated by the UE according to a uniform distribution rule.

If the reference value is larger than or equal to the probability that the base station transmits the DRS successfully, it may be determined that the status generation reason of the subframe having the status that the DRS is not detected in the wireless link measurement window is not the failure of the LBT of the base station; otherwise, the status generation reason of the subframe having the status that the DRS is not detected in the wireless link measurement window is the failure of the LBT of the base station.

Step 45: performing a predetermined detection to a quality of a wireless link in a predetermined assessment period according to the status generation reason and the subframe status of the subframe, so as to determine a state of the wireless link.

Through the ways provided in the present disclosure, after the status generation reason of the subframe in which the DRS is not detected in the wireless link measurement window is clearly obtained, the in-sync detection or the out-of-sync detection of the wireless link may be performed so as to determine the state of the wireless link. The RSRQ measured in this way is closer to an actual RSRQ, and the state of the wireless link may be obtained more accurately through the measured RSRQ, and thereby a result of the in-sync detection or the out-of-sync detection is more accurate.

The in-sync detection and the out-of-sync detection will be described hereinafter in different examples.

Figure 6A:
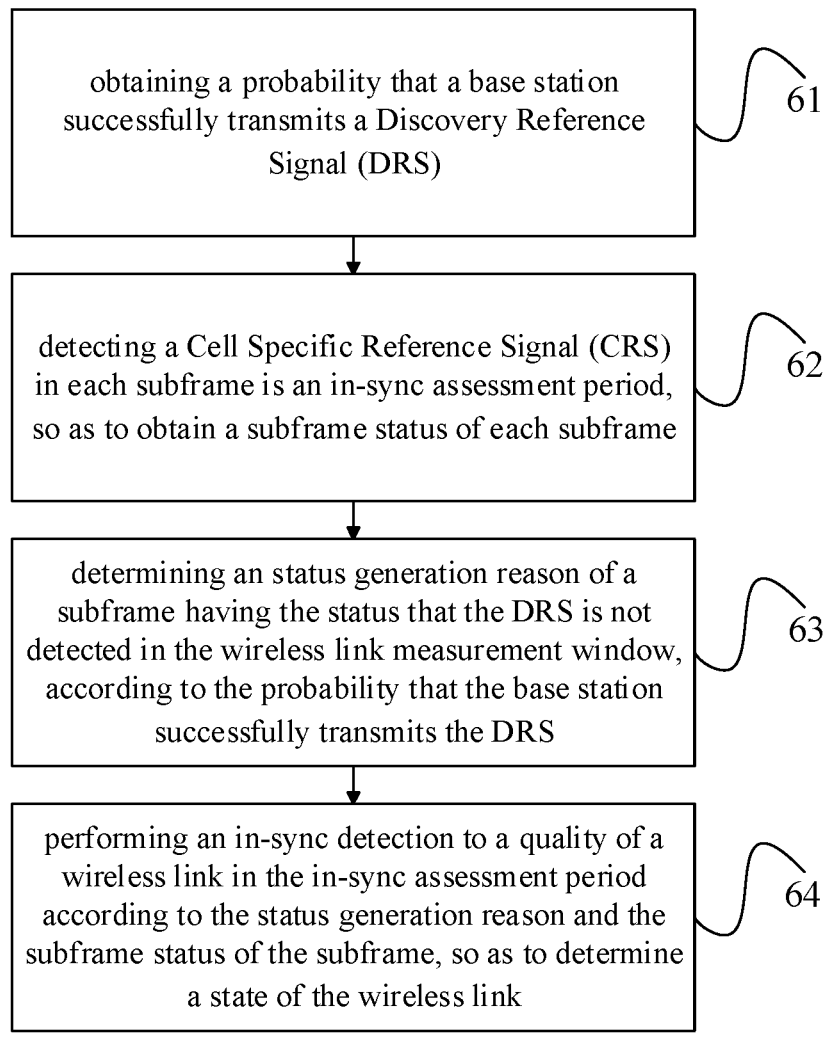
FIG. 6A is a flowchart of a method for measuring a quality of a wireless link according to some embodiments of the present disclosure.
Figure 6B:
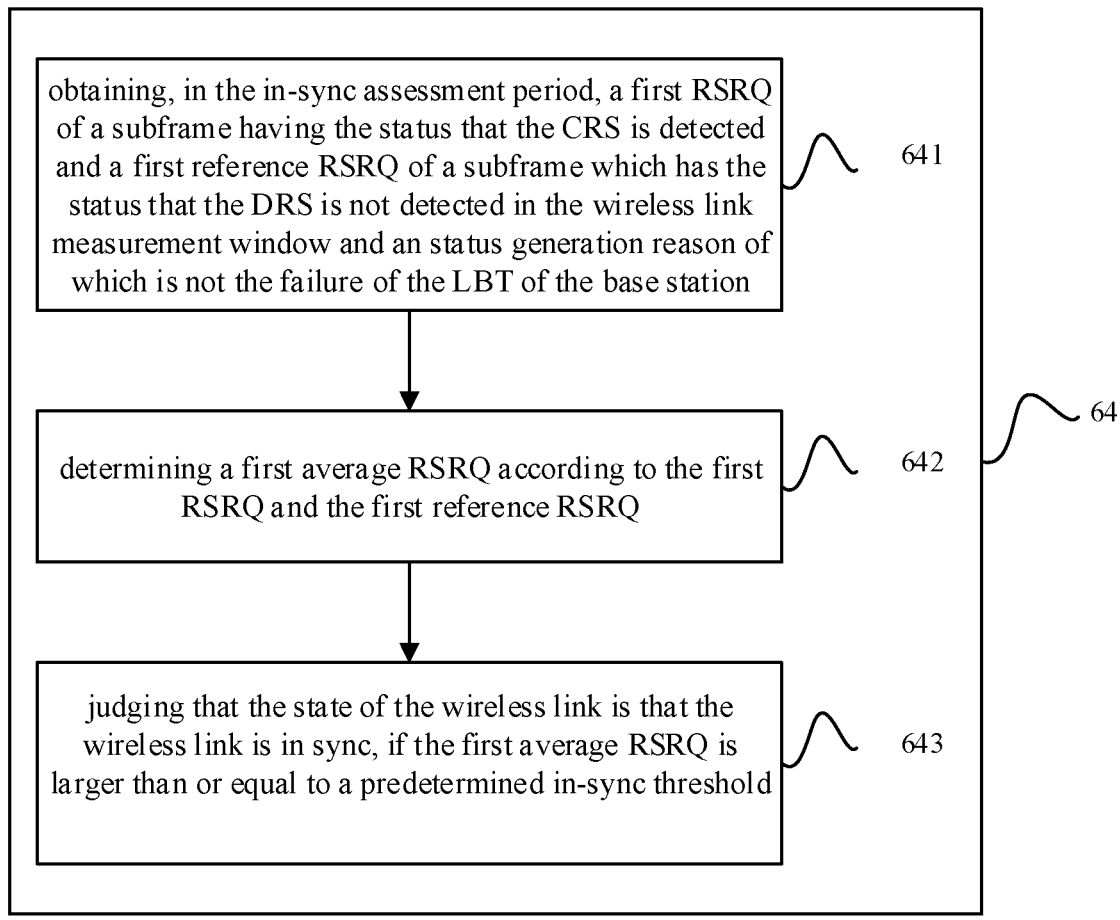
FIG. 6B-6C are detailed flowcharts of a step in the method for measuring a quality of a wireless link according to some embodiments of the present disclosure.
Figure 6C:
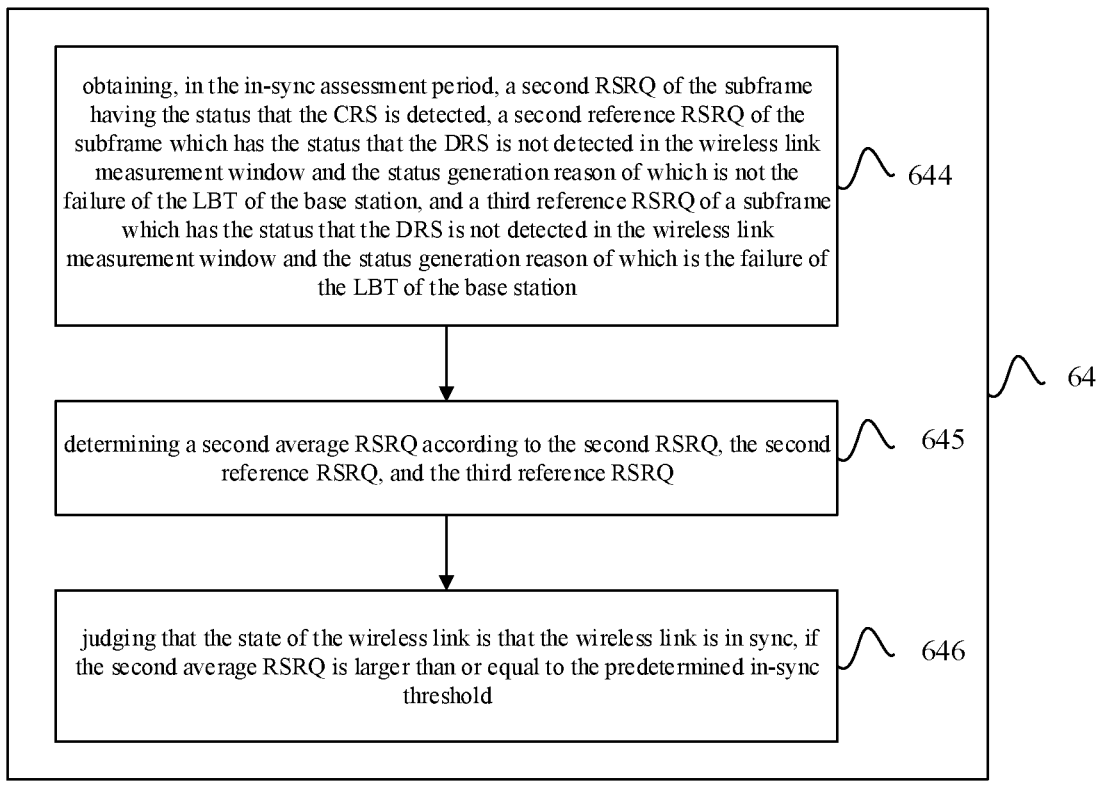

When performing the in-sync detection in the in-sync assessment period, as shown in FIG. 6A, the method for measuring a quality of a wireless link provided in some embodiments of the present disclosure includes steps 61 to steps 64.

Step 61: obtaining a probability that a base station successfully transmits a Discovery Reference Signal (DRS).

Step 62: detecting a Cell Specific Reference Signal (CRS) in each subframe is an in-sync assessment period, so as to obtain a subframe status of each subframe, wherein the subframe status includes a status that the CRS is detected and a status that the DRS is not detected in a wireless link measurement window.

Step 63: determining an status generation reason of a subframe having the status that the DRS is not detected in the wireless link measurement window, according to the probability that the base station successfully transmits the DRS.

It should be noted that the above steps 61-63 are performed in same ways as those shown in FIG. 4.

Step 64: performing an in-sync detection to a quality of a wireless link in the in-sync assessment period according to the status generation reason and the subframe status of the subframe, so as to determine a state of the wireless link.

Specifically, a first implementation of the step 64 in actual applications includes substeps 641-643.

Substep 641: obtaining, in the in-sync assessment period, a first RSRQ of a subframe having the status that the CRS is detected and a first reference RSRQ of a subframe which has the status that the DRS is not detected in the wireless link measurement window and an status generation reason of which is not the failure of the LBT of the base station.

Substep 642: determining a first average RSRQ according to the first RSRQ and the first reference RSRQ.

Substep 643: judging that the state of the wireless link is that the wireless link is in sync, if the first average RSRQ is larger than or equal to a predetermined in-sync threshold.

It should be noted that, the first RSRQ is measured in actual conditions, and the first reference RSRQ cannot be obtained by measurement, and is a virtual value configured by the UE and smaller than a CRS detection threshold.

In this example, by obtaining the average RSRQ through the first RSRQ and the first reference RSRQ, and comparing the average RSRQ with the predetermined in-sync threshold, it may be determined whether the wireless link is in sync or not.

Specifically, a second implementation of the step 64 in actual applications includes substeps 644-646.

Substep 644: obtaining, in the in-sync assessment period, a second RSRQ of the subframe having the status that the CRS is detected, a second reference RSRQ of the subframe which has the status that the DRS is not detected in the wireless link measurement window and the status generation reason of which is not the failure of the LBT of the base station, and a third reference RSRQ of a subframe which has the status that the DRS is not detected in the wireless link measurement window and the status generation reason of which is the failure of the LBT of the base station.

Substep 645: determining a second average RSRQ according to the second RSRQ, the second reference RSRQ, and the third reference RSRQ.

Substep 646: judging that the state of the wireless link is that the wireless link is in sync, if the second average RSRQ is larger than or equal to the predetermined in-sync threshold.

It should be noted that, the second RSRQ is a RSRQ measured in actual conditions; the second reference RSRQ cannot be obtained by measurement, and is a virtual value configured by the UE and smaller than the CRS detection threshold; and the third reference RSRQ is an average value of RSRQs of all subframes having the status that the CRS is detected in the in-sync period (first way), or an average value of RSRQs of all subframes having the status that the CRS is detected in a predetermined time duration (second way), or a fixed value larger than or equal to the CRS detection threshold (third way).

It should be noted that, in actual applications, the third reference RSRQ may also be determined by combining the first through third ways. For example, if the UE determines that a quantity of subframes in which the CRS is detected in the wireless link measurement window is larger than a first predetermined value, the second way may be used to configure the third reference RSRQ; otherwise the UE needs to further determine whether the quantity of subframes in which the CRS is detected in the in-sync assessment period is larger than a second predetermined threshold; if the quantity is larger than the second predetermined threshold, the first way is used to configure the third reference RSRQ, and if the quantity is smaller than the second predetermined threshold, the third way may be used to configured the third reference RSRQ.

It should be noted that, when judging that the state of the wireless link is that the wireless link is in sync, the method further includes transmitting a in-sync indication of the wireless link, wherein an interval at which the in-sync indication of the wireless link is transmitted is larger than or equal to a period of the wireless link measurement window.

It should be further noted that, if a subframe having the status that the CRS is detected and a subframe having the status that the DRS is not detected in the wireless link measurement window do not exist after last transmission of the in-sync indication, the in-sync indication is not transmitted; otherwise, the in-sync indication is transmitted.

In a non-DRX (i.e., continuous reception) mode, when the in-sync detection is performed, the UE measures the RSRP of the CRS in the in-sync assessment period (100 ms) and assesses an average RSRQ of the CRS. If the assessed RSRQ is larger than a predetermined in-sync threshold (Qin) of a downlink channel, the downlink channel is determined to be in sync, and a physical layer of the UE transmits the in-sync indication to higher layers. The UE re-calculates the average RSRQ in the in-sync assessment period every other 10 ms, and a minimum interval at which the physical layer of the UE transmits the in-sync indication is 10 ms.

In a DRX (i.e., discontinuous reception) mode, the in-sync assessment period of the UE is an integral multiple of a DRS period, and the UE re-calculates the average RSRQ in the in-sync assessment period every other DRS period, and a minimum interval at which the physical layer of the UE reports the in-sync indication is a larger one between 10 ms and the DRX period.

However, the base station in the MulteFire system only transmits the CRS in a subframe in which the DRS exists or in a subframe including the transmission of the Physical Downlink Shared CHannel (PDSCH), but does not transmit the CRS in other subframes. In the related art, the UE re-calculates the average RSRQ in the in-sync assessment period every other 10 ms or every other DRX period, and the minimum interval at which the physical layer reports the in-sync indication is 10 ms or the DRX period. Since the UE probably does not detect any subframe including the CRS in the 10 ms or in the DRX period, multiple identical in-sync indications may be reported by the UE additionally, thereby causing the higher layers of the UE to draw an incorrect judgement result about whether the wireless link is in sync.

Because the UE in the MulteFire system definitely uses the subframe including the DRS in the wireless link measurement window when performing the in-sync detection, whether the DRS is detected in the wireless link measurement window or not, the in-sync assessment period in the present disclosure is configured as the integral multiple of the period of the wireless link measurement window. The UE in the MulteFire system re-calculates the average RSRQ in the in-sync assessment period every other period of the wireless link measurement window, and the interval at which the physical layer of the UE reports the in-sync indication is the period of the wireless link measurement window. Optionally, the interval at which the physical layer of the UE reports the in-sync indication is configured as the minimum wireless link measurement window (such as, the minimum wireless link measurement window in the MulteFire is 40 ms).

Further, different in-sync assessment periods may also be arranged. The in-sync assessment period may be configured as a fixed period or an integral multiple of the period of the wireless link measurement window.

Specifically, the in-sync assessment period may be configured as an integral multiple of the period of the wireless link measurement window according to different periods of the wireless link measurement window. As shown in Table 1:

TABLE 1 cases that the in-sync assessment period is configured according to different periods of wireless link measurement windows

| period of wireless link measurement window (s) | in-sync assessment period (period of wireless link measurement window) |
|---|---|
| 0.04 ≤ period of wireless link measurement window ≤ 0.12 | 20 |
| 0.12 < period of wireless link | 10 |

TABLE 1-continued cases that the in-sync assessment period is configured according to different periods of wireless link measurement windows

| period of wireless link measurement window (s) | in-sync assessment period (period of wireless link measurement window) |
|---|---|
| measurement window ≤ 0.64 | |
| 0.64 < period of wireless link measurement window ≤ 2.56 | 5 |

Optionally, the in-sync assessment period may be configured as a fixed period or an integral multiple of the period of the wireless link measurement window according to different periods of the wireless link measurement window. As shown in Table 2:

TABLE 2 cases that the in-sync assessment period is configured as a fixed period or an integral multiple of the period of the wireless link measurement window

| period of wireless link measurement window (s) | in-sync assessment period (period of wireless link measurement window) |
|---|---|
| period of wireless link measurement window ≤ 0.04 | T2(s) |
| 0.04 ≤ period of wireless link measurement window ≤ 0.12 | 20 |
| 0.12 < period of wireless link measurement window ≤ 0.64 | 10 |
| 0.64 < period of wireless link measurement window ≤ 2.56 | 5 |

Figure 7A:
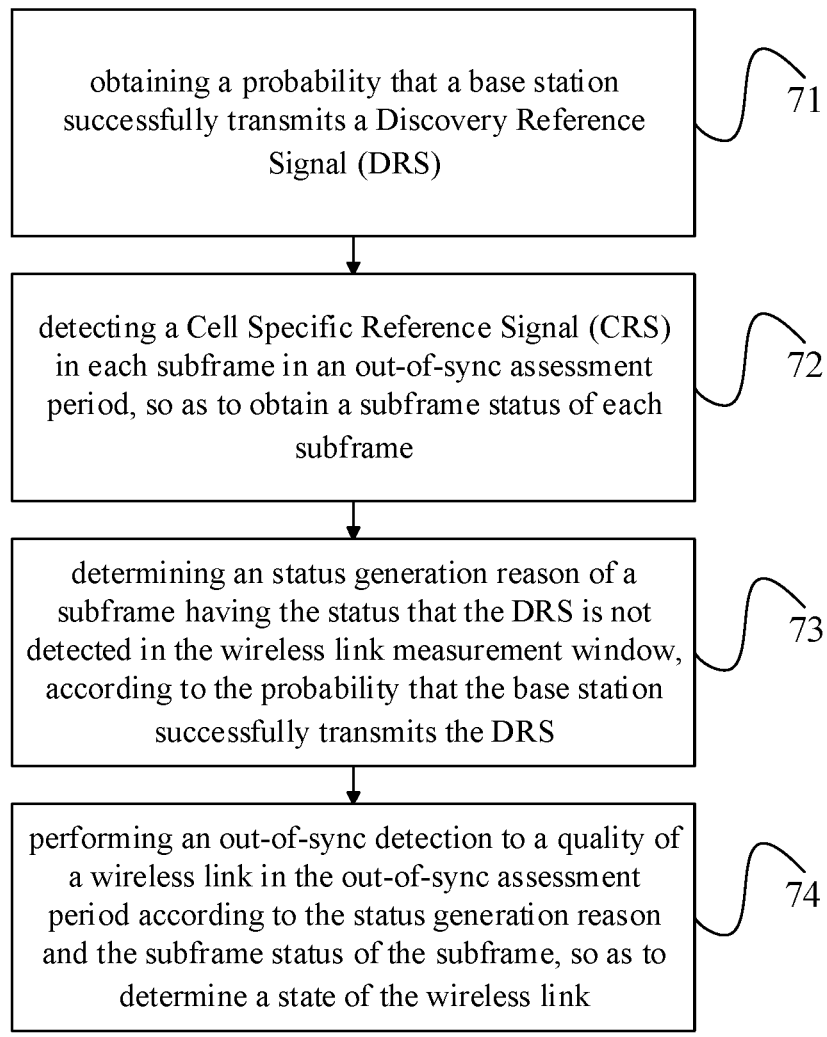
FIG. 7A is a flowchart of a method for measuring a quality of a wireless link according to some embodiments of the present disclosure.
Figure 7B:
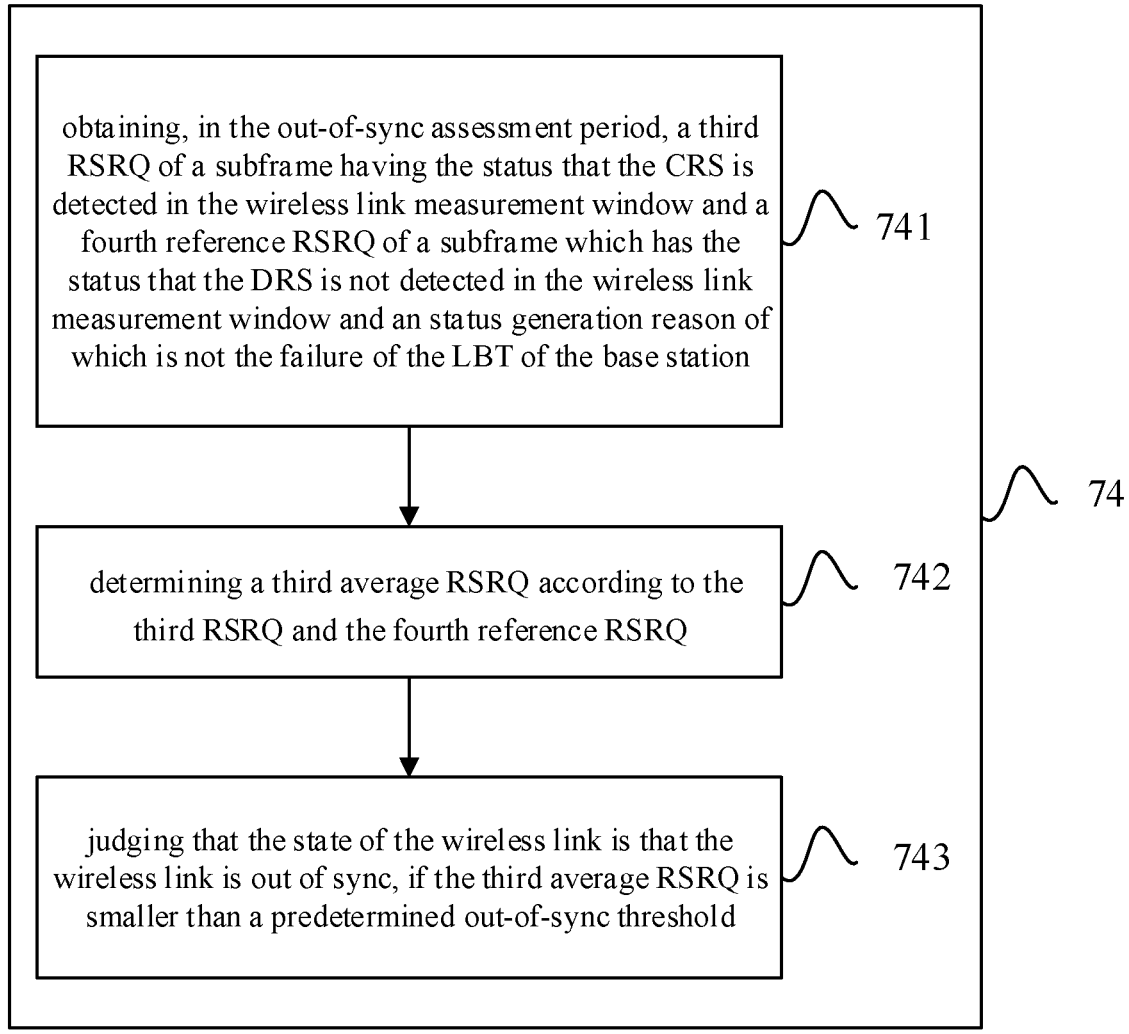
FIG. 7B-7C are detailed flowcharts of a step in the method for measuring a quality of a wireless link according to some embodiments of the present disclosure.
Figure 7C:
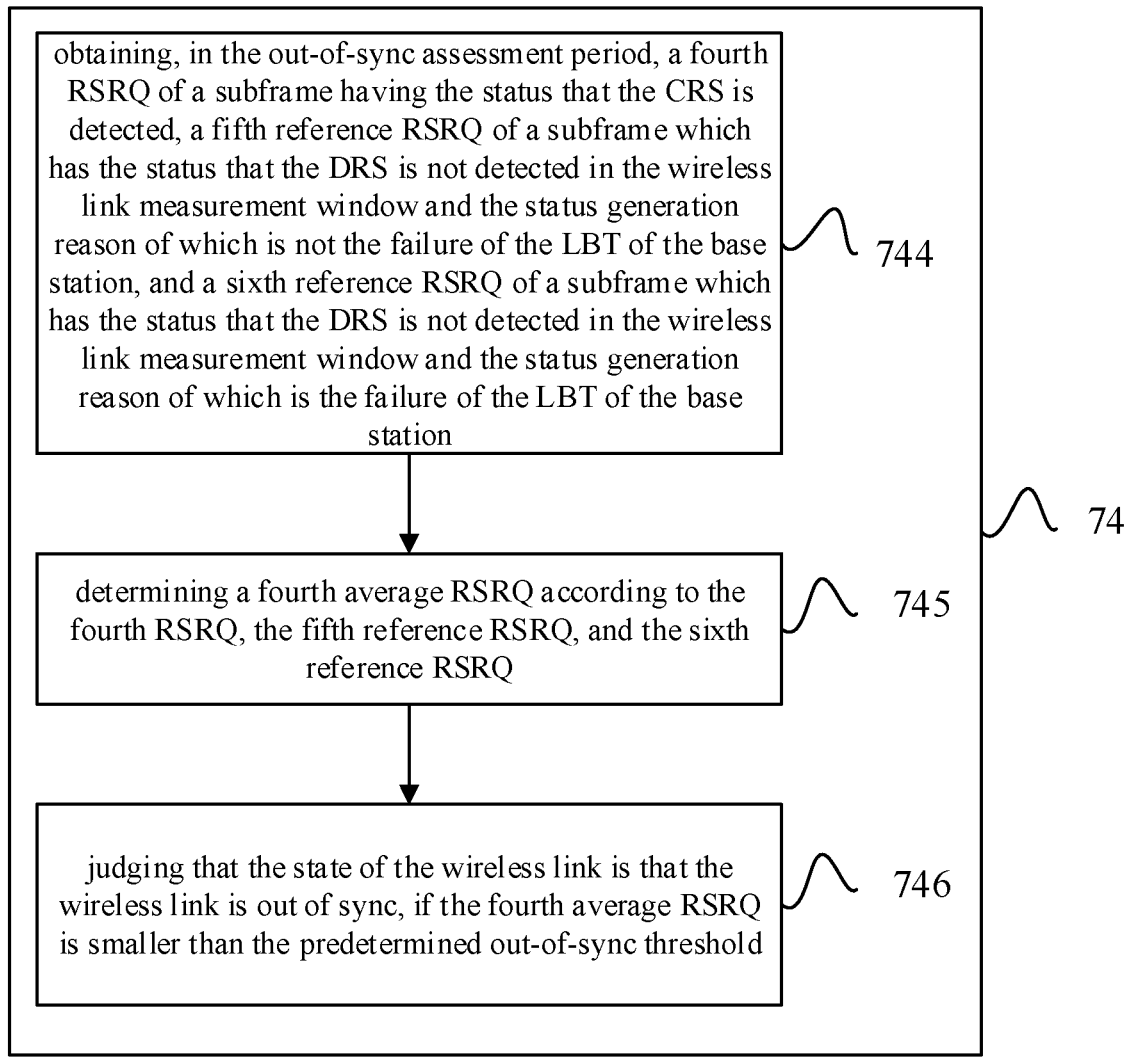

When performing the out-of-sync detection in the out-of-sync assessment period, as shown in FIG. 7A, the method for measuring a quality of a wireless link provided in some embodiments of the present disclosure includes steps 71 to steps 74.

Step 71: obtaining a probability that a base station successfully transmits a Discovery Reference Signal (DRS).

Step 72: detecting a Cell Specific Reference Signal (CRS) in each subframe in an out-of-sync assessment period, so as to obtain a subframe status of each subframe, wherein the subframe status includes a status that the CRS is detected and a status that the DRS is not detected in the wireless link measurement window.

Step 73: determining an status generation reason of a subframe having the status that the DRS is not detected in the wireless link measurement window, according to the probability that the base station successfully transmits the DRS.

It should be noted that the above steps 71-73 are implemented in same ways as those shown in FIG. 4.

Step 74: performing an out-of-sync detection to a quality of a wireless link in the out-of-sync assessment period according to the status generation reason and the subframe status of the subframe, so as to determine a state of the wireless link.

Specifically, a first implementation of the step 74 in actual applications includes substeps 741-743.

Substep 741: obtaining, in the out-of-sync assessment period, a third RSRQ of a subframe having the status that the CRS is detected in the wireless link measurement window and a fourth reference RSRQ of a subframe which has the status that the DRS is not detected in the wireless link measurement window and an status generation reason of which is not the failure of the LBT of the base station.

Substep 742: determining a third average RSRQ according to the third RSRQ and the fourth reference RSRQ.

Substep 743: judging that the state of the wireless link is that the wireless link is out of sync, if the third average RSRQ is smaller than a predetermined out-of-sync threshold.

It should be noted that, the third RSRQ is a RSRQ measured in actual conditions, and the fourth reference RSRQ cannot be obtained by measurement, and is a virtual value configured by the UE and smaller than a CRS detection threshold.

In this example, by obtaining the average RSRQ through the third RSRQ and the fourth reference RSRQ, and comparing the average RSRQ with the predetermined out-of-sync threshold, it may be determined whether the state of the wireless link is that the wireless link is out of sync.

Specifically, a second implementation of the step 74 in actual applications includes substeps 744-746.

Substep 744: obtaining, in the out-of-sync assessment period, a fourth RSRQ of a subframe having the status that the CRS is detected, a fifth reference RSRQ of a subframe which has the status that the DRS is not detected in the wireless link measurement window and the status generation reason of which is not the failure of the LBT of the base station, and a sixth reference RSRQ of a subframe which has the status that the DRS is not detected in the wireless link measurement window and the status generation reason of which is the failure of the LBT of the base station.

Substep 745: determining a fourth average RSRQ according to the fourth RSRQ, the fifth reference RSRQ, and the sixth reference RSRQ.

Substep 746: judging that the state of the wireless link is that the wireless link is out of sync, if the fourth average RSRQ is smaller than the predetermined out-of-sync threshold.

It should be noted that, the fourth RSRQ is a RSRQ measured in actual conditions; the fifth reference RSRQ cannot be obtained by measurement, and is a virtual value configured by the UE and smaller than the CRS detection threshold; and the sixth reference RSRQ is an average value of RSRQs of all subframes having the status that the CRS is detected in an out-of-sync period (first way), or an average value of RSRQs of all subframes having the status that the CRS is detected in a predetermined time period (second way), or a fixed value larger than or equal to the CRS detection threshold (third way).

It should be noted that, in actual applications, the sixth reference RSRQ may also be determined by combining the first through third ways. For example, if the UE determines that a quantity of subframes in which the CRS is detected in the wireless link measurement window is larger than a first predetermined value, the second way may be used to configure the sixth reference RSRQ; otherwise the UE needs to further determine whether the quantity of subframes in which the CRS is detected in the out-of-sync assessment period is larger than a second predetermined threshold; if the quantity is larger than the second predetermined threshold, the first way is used to configure the sixth reference RSRQ, and if the quantity is smaller than the second predetermined threshold, the third way may be used to configured the sixth reference RSRQ.

It should be noted that, in case that a state of a wireless link is judged that the wireless link is out of sync, the method further includes transmitting an out-of-sync indication of the wireless link, wherein an interval at which the out-of-sync indication of the wireless link is transmitted is larger than or equal to a period of the wireless link measurement window.

Similar to the in-sync detection in FIG. 6A, the base station in the MulteFire system only transmits the CRS in a subframe in which the DRS exists or in a subframe including transmission of a Physical Downlink Shared Channel (PDSCH), but does not transmit the CRS in other subframes. In the related art, the UE re-calculates the average RSRQ in the out-of-sync assessment period every other 10 ms or every other DRX period, and the minimum interval at which the physical layer reports the out-of-sync indication is 10 ms or the DRX period. Since the UE may not detect any subframe including the CRS in the 10 ms or in the DRX period, multiple identical out-of-sync indications may be reported by the UE additionally, thereby causing the higher layers of the UE to draw an incorrect judgement result about whether the wireless link is out of sync.

Because the UE in the MulteFire system definitely uses the subframe including the DRS in the wireless link measurement window when performing the out-of-sync detection, whether the DRS is detected in the wireless link measurement window or not, the out-of-sync assessment period in the present disclosure is configured to the integral multiple of the period of the wireless link measurement window, the UE in the MulteFire system re-calculates the average RSRQ in the out-of-sync assessment period every other period of the wireless link measurement window, and the minimum interval at which the physical layer of the UE reports the out-of-sync indication is the period of the wireless link measurement window.

Further, different out-of-sync assessment periods may also be configured. The out-of-sync assessment period may be configured as a fixed period or an integral multiple of the period of the wireless link measurement window.

Specifically, the out-of-sync assessment period may be configured as an integral multiple of the period of the wireless link measurement window according to different periods of the wireless link measurement window. As shown in Table 3:

TABLE 3 cases that the out-of-sync assessment period is configured according to different periods of the wireless link measurement window

| period of wireless link measurement window (s) | out-of-sync assessment period (period of wireless link measurement window) |
| --- | --- |
| 0.04 ≤ period of wireless link measurement window ≤ 0.12 | 40 |
| 0.12 < period of wireless link measurement window ≤ 0.64 | 20 |
| 0.64 < period of wireless link measurement window ≤ 2.56 | 10 |

Optionally, the out-of-sync assessment period may be configured as a fixed period or an integral multiple of the period of the wireless link measurement window according to different periods of the wireless link measurement window. As shown in Table 4:

TABLE 4 cases that the out-of-sync assessment period is configured as a fixed period or an integral multiple of the period of the wireless link measurement window

| period of wireless link measurement window (s) | out-of-sync assessment period (period of wireless link measurement window) |
|---|---|
| period of wireless link measurement window ≤ 0.04 | T1(s) |
| 0.04 ≤ period of wireless link measurement window ≤ 0.12 | 40 |
| 0.12 < period of wireless link measurement window ≤ 0.64 | 20 |
| 0.64 < period of wireless link measurement window ≤ 2.56 | 10 | it should be note that, since the UE may perform the in-sync detection and the out-of-sync detection simultaneously, the first reference RSRQ in FIG. 6A and the fourth reference RSRQ in FIG. 7A may have a same value or different values; the second reference RSRQ and the fifth reference RSRQ may have a same value or different values.

It may be known from the above of the present disclosure that the UE determines, according to the probability that the base station contends a channel in the DTxW, whether the subframe in which the DRS is not detected is caused by the failure of the LBT of the base station and thus the DRS not being sent by the base station, or caused by a poor channel quality. Assume that a probability that the base station transmits the DRS is A %, in case that the UE fails to detect the subframe including the DRS in the DTxW, a probability that a subframe not caused by the failure of the LBT of the base station is mis-determined as a subframe caused by the failure of the LBT of the base station is A %*(1−A %), and a probability that a subframe caused by the failure of the LBT of the base station is mis-determined as a subframe not caused by the failure of the LBT of the base station is A %*(1−A %). The above two probabilities are the same. Thus, the two probabilities may counteract with each other after virtual RSRQs of subframes in which the DRS is not detected are averaged. Furthermore, the UE may configure the virtual RSRQ of the subframe in which the DRS is not detected due to the failure of the LBT of the base station, according to the average of RSRQs of the subframes in which the CRS is detected. An estimation of the RSRQ of the subframe in which the DRS is not detected due to the failure of the LBT3 of the base station is more accurate. With respect to a characteristic that the CRS is only sent in subframes in which the DRS is arranged or other subframes including the transmission of the PDSCH, and not in remaining subframes, by the base station, an interval at which the physical layer re-measures the in-sync and the out-of-sync and reports the in-sync of the wireless link and the out-of-sync of the wireless link is set as the period of the wireless link measurement window in the present disclosure. In the present disclosure, an assessment result of an average RSRQ of the CRS in the in-sync detection or the out-of-sync detection performed by the UE is extremely close to actual conditions. Thus, a result of the in-sync detection or the out-of-sync detection is more accurate.

Figure 8A:
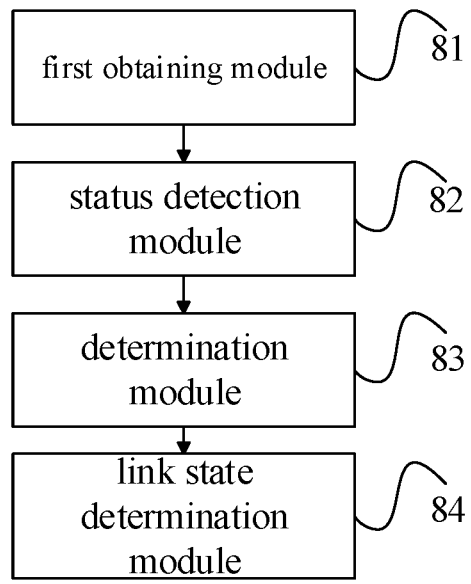
FIG. 8A is a structural schematic diagram of a User Equipment according to some embodiments of the present disclosure.
Figure 8B:
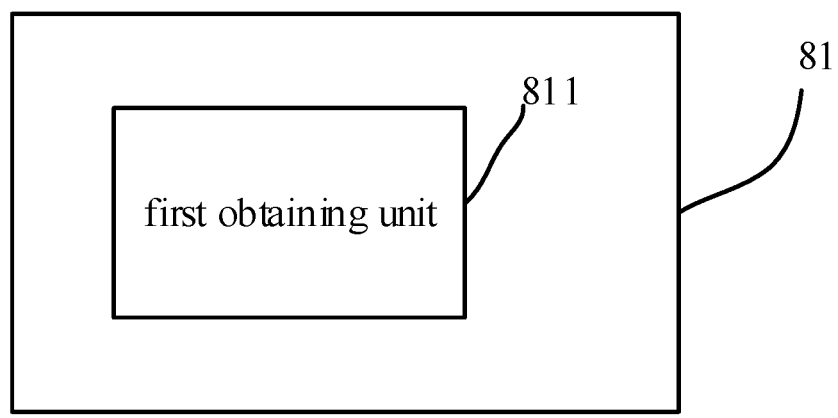
FIG. 8B-8C are structural schematic diagrams of a module in the User Equipment according to some embodiments of the present disclosure.
Figure 8C:
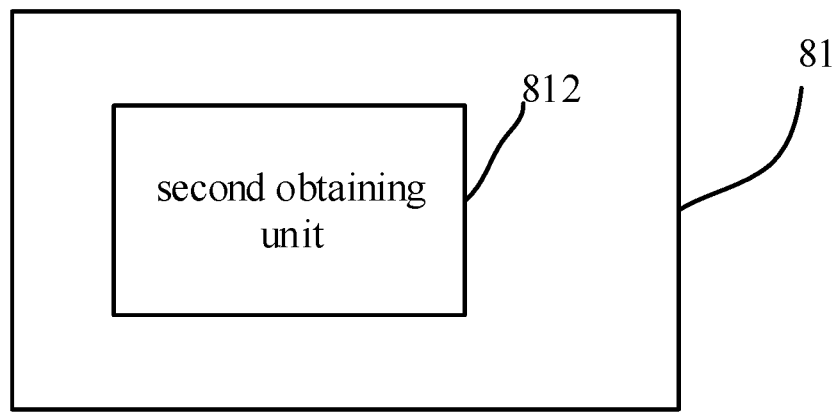

As shown in FIG. 8A, some embodiments of the present disclosure provide a User Equipment (UE). The UE includes a first obtaining module 81 configured to obtain a probability that a base station successfully transmits a Discovery Reference Signal (DRS); a status detection module 82 configured to detect a Cell Specific Reference Signal (CRS) in each subframe in a predetermined assessment period so as to obtain a subframe status of the each subframe, wherein the subframes status includes a status that the CRS is detected and a status that the DRS is not detected in a wireless link measurement window; a determination module 83 configured to determine, according to the probability that the base station successfully transmits the DRS, a status generation reason that a subframe having the status that the DRS is not detected in the wireless link measurement window; and a link state determination module 84 configured to perform predetermined detection to a quality of a wireless link in a predetermined assessment period according to the status generation reason and the subframe state so as to determine a state of the wireless link.

Optionally, the first obtaining module includes a first obtaining unit 811 configured to obtain the probability that the base station successfully transmits the DRS, the probability being transmitted by the base station in a predetermined period, through a system broadcast; or a second obtaining unit 812 configured to obtain an average channel occupancy rate computed in the predetermined period and transmitted by the base station in the system broadcast, and determine the probability that the base station successfully transmits the DRS, according to the average channel occupancy rate.

Furthermore, the second obtaining unit is specifically configured to take the average channel occupancy rate as the probability that the base station successfully transmits the DRS; or calculate, according to the average channel occupancy rate, the probability that the base station successfully transmits the DRS.

Optionally, the status detection module 82 is specifically configured to: mark a subframe status of a subframe being detected as the status that the CRS is detected, in case that a Reference Signal Receiving Quality (RSRQ) of the CRS is detected to be larger than or equal to a CRS detection threshold in the predetermined assessment period.

Optionally, the status detection module 82 is specifically configured to: mark a subframe status of a subframe in which the DRS is detected as the status that the CRS is detected, in case that the DRS is detected in a wireless link measurement window in the predetermined assessment period.

Optionally, the status detection module 82 is specifically configured to: mark a subframe status of a subframe in which the DRS is not detected as the status that the DRS is not detected in the wireless link measurement window, in case that the DRS is not detected in the wireless link measurement window in the predetermined assessment period.

It should be noted that the predetermined assessment period is a predetermined value or an integral multiple of a period of the wireless link measurement window.

Optionally, the UE further includes a judgement module. The judgement module is configured to judge the subframe having the status that the DRS is not detected in the wireless link measurement window; if a part or all of the subframes in a DRS transmission window are in downlink continuous data subframes corresponding to subframes having the status that the CRS is detected, judge that the status generation reason of the subframe having the status that the DRS is not detected in the wireless link measurement window is not failure of the LBT of the base station.

The judgement module is configured to: if a part or all of the subframes in the DRS transmission window are not in downlink continuous data subframes corresponding to subframes having the status that the CRS is detected, judge, according to the probability that the base station successfully transmits the DRS, the status generation reason of the subframe having the status that the DRS is not detected in the wireless link measurement window.

Specifically, the judgement module is configured to: if a part or all of the subframes in the DRS transmission window is in downlink continuous data subframes corresponding to subframes having the status that the CRS is detected before the DRS transmission window or in the wireless link measurement window, or if a part or all of the subframes in the DRS transmission window is in downlink continuous data subframes corresponding to subframes having the status that the CRS is detected after the DRS transmission window, judge that the status generation reason of the subframe having the status that the DRS is not detected in the wireless link measurement window is not failure of the LBT of the base station.

Optionally, the determination module 83 is specifically configured to: if the probability that the base station transmits the DRS successfully is larger than or equal to a predetermined probability threshold, determine that the status generation reason of the subframe having the status that the DRS is not detected in the wireless link measurement window is the failure of the LBT of the base station; otherwise, the status generation reason of the subframe having the status that the DRS is not detected in the wireless link measurement window is not the failure of the LBT of the base station.

Optionally, the determination module 83 is specifically configured to obtain a reference value generated according to a predetermined rule, wherein the reference value is larger than or equal to 0 and smaller than or equal to 1; if the reference value is larger than or equal to the probability that the base station transmits the DRS successfully, determine that the status generation reason of the subframe having the status that the DRS is not detected in the wireless link measurement window is not the failure of the LBT of the base station; otherwise, the status generation reason of the subframe having the status that the DRS is not detected in the wireless link measurement window is the failure of the LBT of the base station.

Optionally, if the predetermined assessment period is an in-sync assessment period, the predetermined detection is an in-sync detection, the link state determination module 84 includes a third obtaining unit, a first determination unit, and a first judgement unit, or includes a fourth obtaining unit, a second determination unit and a third judgement unit.

The third obtaining unit is configured to obtain, in the in-sync assessment period, a first RSRQ of a subframe having the status that the CRS is detected, and a first reference RSRQ of a subframe which has the status that the DRS is not detected in the wireless link measurement window and a status generation reason of which is not the failure of the LBT of the base station; the first determination unit is configured to determine a first average RSRQ according to the first RSRQ and the first reference RSRQ; and the first judgement unit is configured to judge a state of the wireless link is that the wireless link is in sync in case that the first average RSRQ is larger than or equal to a predetermined in-sync threshold.

The fourth obtaining unit is configured to obtain, in the in-sync assessment period, a second RSRQ of a subframe having the status that the CRS is detected, a second reference RSRQ of a subframe which has the status that the DRS is not detected in the wireless link measurement window and a status generation reason of which is not the failure of the LBT of the base station, and a third reference RSRQ of a subframe which has the status that the DRS is not detected in the wireless link measurement window and the status generation reason of which is the failure of the LBT of base station; the second determination unit is configured to determine a second average RSRQ according to the second RSRQ, the second reference RSRQ and the third reference RSRQ; and the second judgement unit is configured to determine the state of the wireless link is that the wireless link is in sync in case that the second average RSRQ is larger than or equal to the predetermined in-sync threshold.

Both the first reference RSRQ and the second reference RSRQ are smaller than the CRS detection threshold. The third reference RSRQ is an average value of RSRQs of all subframes having the status that the CRS is detected in an in-sync period, or an average value of RSRQs of all subframes having the status that the CRS is detected in a predetermined time interval, or a fixed value larger than or equal to the CRS detection threshold.

In case that the state of the wireless link is determined as the wireless link being in sync, the UE further includes an in-sync indication transmission module. The in-sync indication transmission module is configured to transmit an in-sync indication of the wireless link, wherein an interval at which the in-sync indication of the wireless link is transmitted is larger than or equal to a period of the wireless link measurement window.

Optionally, in case that the UE is configured with a predetermined report value of the interval at which the in-sync indication of the wireless link is transmitted, the larger one between the predetermined report value and the period of the wireless link measurement window is selected as the interval at which the in-sync indication of the wireless link is transmitted.

Optionally, the in-sync indication transmission module is specifically configured to, if a subframe having the status that the CRS is detected or a subframe having the status that the DRS is not detected in the wireless link measurement window do not exist after last transmission of the in-sync indication, not transmit the in-sync indication; otherwise, transmit the in-sync indication.

Optionally, if the predetermined assessment period is an out-of-sync assessment period, the predetermined detection is an out-of-sync detection, the link state determination module 84 includes a fifth obtaining unit, a third determination unit, and a third judgement unit, or includes a sixth obtaining unit, a fourth determination unit and a fourth judgement unit.

The fifth obtaining unit is configured to obtain, in the out-of-sync assessment period, a third RSRQ of a subframe having the status that the CRS is detected in the wireless link measurement window, and a fourth reference RSRQ of a subframe which has the status that the DRS is not detected in the wireless link measurement window and a status generation reason of which is not the failure of the LBT of the base station; the third determination unit is configured to determine a third average RSRQ according to the third RSRQ and the fourth reference RSRQ; and the third judgement unit is configured to judge the state of the wireless link is that the wireless link is out of sync in case that the third average RSRQ is smaller than a predetermined out-of-sync threshold.

Optionally, the sixth obtaining unit is configured to obtain, in the out-of-sync assessment period, a fourth RSRQ of a subframe having the status that the CRS is detected in the wireless link measurement window, a fifth reference RSRQ of a subframe which has the status that the DRS is not detected in the wireless link measurement window and a status generation reason of which is not the failure of the LBT of the base station, and a sixth reference RSRQ of a subframe which has the status that the DRS is not detected in the wireless link measurement window and the status generation reason of which is the failure of the LBT of base station; the fourth determination unit is configured to determine a fourth average RSRQ according to the fourth RSRQ, the fifth reference RSRQ and the sixth reference RSRQ; and the fourth judgement unit is configured to judge the state of the wireless link is that the wireless link is out of sync in case that the fourth average RSRQ is smaller than the predetermined out-of-sync threshold.

Both the fourth reference RSRQ and the fifth reference RSRQ are smaller than the CRS detection threshold.

The sixth reference RSRQ is an average value of RSRQs of all subframes having the status that the CRS is detected in the out-of-sync period, or an average value of RSRQs of all subframes having the status that the CRS is detected in a predetermined time interval, or a fixed value larger than or equal to the CRS detection threshold.

In case that the state of the wireless link is judged as the wireless link being out of sync, the UE further includes an out-of-sync indication transmission module. The out-of-sync indication transmission module is configured to transmit an out-of-sync indication of the wireless link, wherein an interval at which the out-of-sync indication of the wireless link is transmitted is larger than or equal to the period of the wireless link measurement window.

Furthermore, in case that the UE is configured with a predetermined report value of the interval at which the out-of-sync indication of the wireless link is transmitted, the larger one between the predetermined report value and the period of the wireless link measurement window is selected as the interval at which the out-of-sync indication of the wireless link is transmitted.

It should be noted that the wireless-link measurement window in the present disclosure is the DTxW or the DMTC, or is a window including the DTxW or the DMTC.

The embodiments related to the UE correspond to the method for measuring a quality of a wireless link mentioned above in the present disclosure. All implementations in the method in the above embodiments are applicable to the UE in the present disclosure and may achieve the same technical effects.

Figure 9:
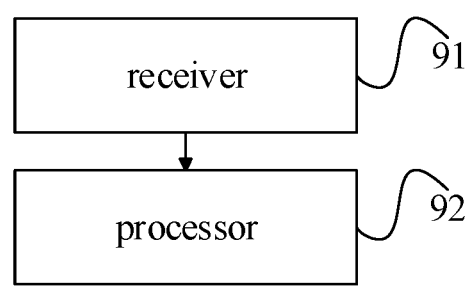
FIG. 9 is a structural schematic diagram of a User Equipment according to some embodiments of the present disclosure.

As shown in FIG. 9, some embodiments of the present disclosure further provide a User Equipment (UE). The UE includes a receiver 91 and a processor 92. The receiver 91 is configured to receive a probability that a base station successfully transmits a Discovery Reference Signal (DRS). The processor 92 is connected to the receiver 91 and configured to: detect a Cell Specific Reference Signal (CRS) in each subframe in a predetermined assessment period so as to obtain a subframe status of the each subframe, wherein the subframe status includes a status that the CRS is detected and a status that the DRS is not detected in a wireless link measurement window; determine, according to the probability that the base station successfully transmits the DRS, a status generation reason of a subframe having the status that the DRS is not detected in the wireless link measurement window; and perform predetermined detection to a quality of a wireless link in the predetermined assessment period according to the status generation reason and the subframe status so as to determine a state of the wireless link.

The processor 92 may be configured to implement the functions of the modules or units in the UE in the above embodiments, and may achieve same technical effects as those of the UE in the above embodiments.

It should be noted that, the UE in the embodiments of the present disclosure may be a mobile phone (or a handset), or other devices capable of transmitting or receiving wireless signals including a UE (terminal), a personnel digital assistance (PDA), a wireless Modulator and Demodulator (Modem), a wireless communication device, a handhold device, a laptop, a wireless phone, a wireless local loop (WLL) station, a Customer Premise of Equipment (CPE) or a MiFi capable of transforming a cellular signal to a WiFi signal, an intelligent household electrical appliance, or other devices capable of automatically communicate with a mobile communication network without operations of a user.

The above embodiments of the present disclosure describe basic principles of the present disclosure. However, it should be understood that one skilled in the art may implement a part or all or any step or component of the method and device in the present disclosure in any computing device (including a processor, a storage, or the like) or in any network including computing devices, in hardware, firmware, software, or a combination thereof, after one skilled in the art reads the present disclosure and uses his/or basic programming skills.

Therefore, the present disclosure may be implemented by a program or a set of programs executed on any computing device. The computing device may be a general device known in the art. Therefore, an objective of the present disclosure may also be implemented by a product including programs and codes for implementing the method and the device. That is, the product including the programs and codes for implementing the method and the device also form a part of the present disclosure, and a storage medium storing the programs and codes also forms a part of the present disclosure. Obviously, the storage medium may be any storage medium known in the art or any storage medium to be developed in fugure. It is further pointed out that modules, submodules or units or steps in the method or the device in the present disclosure may be decomposed and/or recombined. Such decomposition and/or recombination also belong to equivalent technical solutions of the present disclosure. The steps in the above may be performed in a chronological sequence naturally, but do not necessarily be performed in the described sequence. Some of the steps may be performed simultaneously or independently.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A method for measuring a quality of a wireless link, the method being used in a User Equipment (UE) and comprising:

obtaining a probability that a base station successfully transmits a Discovery Reference Signal (DRS);

detecting a Cell Specific Reference Signal (CRS) in each subframe in a predetermined assessment period, so as to obtain a subframe status of the each subframe, wherein the subframe status comprises a status that the CRS is detected and a status that the DRS is not detected in a wireless link measurement window;

determining a status generation reason of a subframe having the status that the DRS is not detected in the wireless link measurement window, according to the probability that the base station successfully transmits the DRS; and performing a predetermined detection to the quality of the wireless link in the predetermined assessment period according to the status generation reason and the subframe status of the subframe, so as to determine a state of the wireless link.

2. The method according to claim 1, wherein, the obtaining the probability that the base station successfully transmits the DRS, comprises:
obtaining the probability that the base station transmits the DRS successfully, wherein the probability is transmitted through a system broadcast in a predetermined period; or
obtaining an average channel occupancy rate computed in the predetermined period and transmitted by the base station in the system broadcast, and determining the probability that the base station successfully transmits the DRS, according to the average channel occupancy rate.

3. The method according to claim 2, wherein, the obtaining the average channel occupancy rate computed in the predetermined period and transmitted by the base station in the system broadcast, and determining the probability that the base station successfully transmits the DRS, according to the average channel occupancy rate, comprises:
taking the average channel occupancy rate as the probability that the base station successfully transmits the DRS; or
calculating the probability that the base station successfully transmits the DRS, according to the average channel occupancy rate.

4. The method according to claim 1, wherein the detecting the CRS in the each subframe in the predetermined assessment period, so as to obtain the subframe status of the each subframe, comprises:
marking a subframe status of a subframe being detected as the status that the CRS is detected, in case that a Reference Signal Receiving Quality (RSRQ) of the CRS is detected to be larger than or equal to a CRS detection threshold in the predetermined assessment period; and/or
marking a subframe status of a subframe in which the DRS is detected as the status that the CRS is detected, in case that the DRS is detected in the wireless link measurement window in the predetermined assessment period; and/or
marking a subframe status of a subframe in which the DRS is not detected as the status that the DRS is not detected, in case that the DRS is not detected in the wireless link measurement window in the predetermined assessment period.

5. The method according to claim 1, wherein, before determining the status generation reason of the subframe having the status that the DRS is not detected in the wireless link measurement window, according to the probability that the base station successfully transmits the DRS, the method further comprises:
judging the subframe having the status that the DRS is not detected in the wireless link measurement window; and
if a part or all of the subframes in a DRS transmission window are in downlink continuous data subframes corresponding to subframes having the status that the CRS is detected, determining that the status generation reason of the subframe having the status that the DRS is not detected in the wireless link measurement window is not failure of a Listen Before Talk (LBT) of the base station.

6. The method according to claim 5, further comprising:
if the part or all of the subframes in the DRS transmission window are not in the downlink continuous data subframes corresponding to the subframes having the status that the CRS is detected, determining, according to the probability that the base station successfully transmits the DRS, the status generation reason of the subframe having the status that the DRS is not detected in the wireless link measurement window.

7. The method according to claim 5, wherein if the part or all of the subframes in the DRS transmission window are in the downlink continuous data subframes corresponding to the subframes having the status that the CRS is detected, determining that the status generation reason of the subframe having the status that the DRS is not detected in the wireless link measurement window is not failure of the LBT of the base station, comprises:
if the part or all of the subframes in the DRS transmission window are in the downlink continuous data subframes corresponding to the subframes having the status that the CRS is detected before the DRS transmission window or in the wireless link measurement window, or the part or all of the subframes in the DRS transmission window are in the downlink continuous data subframes corresponding to the subframes having the status that the CRS is detected after the DRS transmission window, determining that the status generation reason of the subframe having the status that the DRS is not detected in the wireless link measurement window is not failure of the LBT of the base station.

8. The method according to claim 1, wherein, the determining the status generation reason of the subframe having the status that the DRS is not detected in the wireless link measurement window, according to the probability that the base station successfully transmits the DRS, comprises:
if the probability that the base station transmits the DRS successfully is larger than or equal to a predetermined probability threshold, determining that the status generation reason of the subframe having the status that the DRS is not detected in the wireless link measurement window is failure of a Listen Before Talk (LBT) of the base station;
if the probability that the base station transmits the DRS successfully is smaller than the predetermined probability threshold, determining that the status generation reason of the subframe having the status that the DRS is not detected in the wireless link measurement window is not the failure of the LBT of the base station.

9. The method according to claim 1, wherein, the determining the status generation reason of the subframe having the status that the DRS is not detected in the wireless link measurement window, according to the probability that the base station successfully transmits the DRS, comprises:
obtaining a reference value generated according to a predetermined rule, wherein the reference value is larger than or equal to 0 and smaller than or equal to 1;
determining that the status generation reason of the subframe having the status that the DRS is not detected in the wireless link measurement window is not failure of a Listen Before Talk (LBT) of the base station, in case that the reference value is larger than or equal to the probability that the base station transmits the DRS successfully;
determining that the status generation reason of the subframe having the status that the DRS is not detected in the wireless link measurement window is the failure of the LBT of the base station, in case that the reference value is smaller than the probability that the base station transmits the DRS successfully.

10. The method according to claim 1, wherein in case that the predetermined assessment period is an in-sync assessment period and the predetermined detection is an in-sync detection, performing the predetermined detection to the quality of the wireless link in the predetermined assessment period according to the status generation reason and the subframe status of the subframe, so as to determine the state of the wireless link, comprises:
  obtaining, in the in-sync assessment period, a first Reference Signal Receiving Quality (RSRQ) of a subframe having the status that the CRS is detected, and a first reference RSRQ of a subframe which has the status that the DRS is not detected in the wireless link measurement window and a status generation reason of which is not failure of a Listen Before Talk (LBT) of the base station;
  determining a first average RSRQ according to the first RSRQ and the first reference RSRQ; and
  judging that the state of the wireless link is that the wireless link is in sync, in case that the first average RSRQ is larger than or equal to a predetermined in-sync threshold.

11. The method according to claim 1, wherein in case that the predetermined assessment period is the in-sync assessment period and the predetermined detection is the in-sync detection, performing the predetermined detection to the quality of the wireless link in the predetermined assessment period according to the status generation reason and the subframe status of the subframe, so as to determine the state of the wireless link, comprises:
  obtaining, in the in-sync assessment period, a second Reference Signal Receiving Quality (RSRQ) of the subframe having the status that the CRS is detected, a second reference RSRQ of the subframe which has the status that the DRS is not detected in the wireless link measurement window and the status generating reason of which is not failure of a Listen Before Talk (LBT) of the base station, and a third reference RSRQ of the subframe which has the status that the DRS is not detected in the wireless link measurement window and the status generation reason of which is the failure of the LBT of the base station;
  determining a second average RSRQ according to the second RSRQ, the second reference RSRQ, and the third reference RSRQ;
  judging that the state of the wireless link is that the wireless link is in sync, in case that the first average RSRQ is larger than or equal to a predetermined in-sync threshold.

12. The method according to claim 11, wherein the second reference RSRQ is smaller than the CRS detection threshold,
  the third reference RSRQ is an average value of RSRQs of all subframes having the status that the CRS is detected in an in-sync period, or an average value of RSRQs of all subframes having the status that the CRS is detected in a predetermined time interval, or a fixed value larger than or equal to the CRS detection threshold.

13. The method according to claim 1, wherein after the state of the wireless link is judged, the method further comprises:
  in case that the state of the wireless link is that the wireless link is in sync, transmitting an in-sync indication of the wireless link, wherein a time interval at which the in-sync indication of the wireless link is transmitted is larger than or equal to a period of the wireless link measurement window.

14. The method according to claim 13, wherein, transmitting the in-sync indication of the wireless link, comprises:
  in case that a subframe having the status that the CRS is detected or a subframe having the status that the DRS is not detected in the wireless link measurement window does not exist after last transmission of the in-sync indication, not transmitting the in-sync indication;
  in case that a subframe having the status that the CRS is detected and a subframe having the status that the DRS is not detected in the wireless link measurement window exist after last transmission of the in-sync indication, transmitting the in-sync indication.

15. The method according to claim 13, wherein, in case that the UE is configured with a predetermined report value of the time interval at which the in-sync indication of the wireless link is transmitted, a larger one between the predetermined report value and the period of the wireless link measurement window is selected as the time interval at which the in-sync indication of the wireless link is transmitted.

16. The method according to claim 1, wherein in case that the predetermined assessment period is an out-of-sync assessment period and the predetermined detection is an out-of-sync detection, performing the predetermined detection to the quality of the wireless link in the predetermined assessment period according to the status generation reason and the subframe status of the subframe, so as to determine the state of the wireless link, comprises:
  obtaining, in the out-of-sync assessment period, a third Reference Signal Receiving Quality (RSRQ) of a subframe having the status that the CRS is detected in the wireless link measurement window and a fourth reference RSRQ of a subframe which has the status that the DRS is not detected in the wireless link measurement window and a status generation reason of which is not failure of a Listen Before Talk (LBT) of the base station;
  determining a third average RSRQ according to the third RSRQ and the fourth reference RSRQ; and
  judging that the state of the wireless link is that the wireless link is out of sync, in case that the third average RSRQ is smaller than a predetermined out-of-sync threshold.

17. The method according to claim 1, wherein in case that the predetermined assessment period is an out-of-sync assessment period and the predetermined detection is an out-of-sync detection, performing the predetermined detection to the quality of the wireless link in the predetermined assessment period according to the status generation reason and the subframe status of the subframe, so as to determine the state of the wireless link, comprises:
  obtaining, in the out-of-sync assessment period, a fourth Reference Signal Receiving Quality (RSRQ) of a subframe having the status that the CRS is detected in the wireless link measurement window, and a fifth reference RSRQ of a subframe which has the status that the DRS is not detected in the wireless link measurement window and a status generation reason of which is not failure of a Listen Before Talk (LBT) of the base station, and a sixth reference RSRQ of a subframe which has the status that the DRS is not detected in the wireless link measurement window and a status generation reason of which is the failure of the LBT of the base station;

determining a fourth average RSRQ according to the fourth RSRQ, the fifth reference RSRQ, and the sixth reference RSRQ;

judging that the state of the wireless link is that the wireless link is out of sync, in case that the fourth average RSRQ is smaller than a predetermined out-of-sync threshold.

18. The method according to claim 1, wherein after the state of the wireless link is judged, the method further comprises:

in case that the state of the wireless link is that the wireless link is out of sync, transmitting an out-of-sync indication of the wireless link, wherein a time interval at which the out-of-sync indication of the wireless link is transmitted is larger than or equal to a period of the wireless link measurement window.

19. A user equipment, comprising:

a first obtaining circuit, configured to obtain a probability that a base station successfully transmits a Discovery Reference Signal (DRS);

a status detection circuit, configured to detect a Cell Specific Reference Signal (CRS) in each subframe in a predetermined assessment period, so as to obtain a subframe status of the each subframe, wherein the subframe status comprises a status that the CRS is detected and a status that the DRS is not detected in a wireless link measurement window;

a determination circuit, configured to determine a status generation reason of a subframe having the status that the DRS is not detected in the wireless link measurement window, according to the probability that the base station successfully transmits the DRS; and a link state determination circuit, configured to perform predetermined detection to a quality of a wireless link in a predetermined assessment period according to the status generation reason and the subframe status of the subframe, so as to determine a state of the wireless link.

20. A user equipment, comprising: a receiver and a processor;

wherein the receiver is configured to receive a probability that a base station successfully transmits a Discovery Reference Signal (DRS); and the processor is connected to the receiver and is configured to implement the method according to claim 1.

* * * * *